United States Patent

SanGregory et al.

[11] Patent Number: 5,593,104
[45] Date of Patent: Jan. 14, 1997

[54] FILM SPOOL

[75] Inventors: Jude A. SanGregory, Spencerport; James G. Rydelek, Henrietta, both of N.Y.

[73] Assignee: Eastman Kodak Company, Rochester, N.Y.

[21] Appl. No.: 341,784

[22] Filed: Nov. 18, 1994

[51] Int. Cl.$^6$ .................................................. B65H 75/28
[52] U.S. Cl. ................................ 242/348.1; 242/584.1
[58] Field of Search .................... 242/332, 332.4, 242/332.7, 348, 348.1, 348.3, 532.4, 532.7, 562, 562.1, 584.1, 587.1; 354/212, 214, 275

[56] References Cited

U.S. PATENT DOCUMENTS

| | | |
|---|---|---|
| 2,005,405 | 6/1935 | Wittel . |
| 2,032,214 | 2/1936 | Howell . |
| 3,155,337 | 11/1964 | Uterhart ................................ 242/584.1 |
| 4,181,271 | 1/1980 | Kluczynski et al. . |
| 4,303,325 | 12/1981 | Seely ...................................... 354/212 |
| 4,314,751 | 2/1982 | Harvey ................................... 354/212 |
| 4,600,286 | 7/1986 | Harvey ................................... 354/212 |
| 4,623,232 | 11/1986 | Wong et al. ............................. 354/212 |
| 4,852,821 | 8/1989 | Harris et al. . |
| 4,930,712 | 6/1990 | Smart . |
| 4,965,616 | 10/1990 | Horiuchi ................................. 354/212 |
| 5,215,273 | 6/1993 | Greene . |
| 5,230,479 | 7/1993 | Ritchie . |
| 5,295,634 | 3/1994 | Zander et al. . |
| 5,295,635 | 3/1994 | Niedospial, Jr. et al. . |
| 5,395,068 | 3/1995 | Kostudus et al. ...................... 242/348.1 |

FOREIGN PATENT DOCUMENTS

| | | | |
|---|---|---|---|
| 2444106 | 3/1976 | Germany ............................. 242/584.1 |
| 590738 | 7/1947 | United Kingdom . |

*Primary Examiner*—John P. Darling
*Attorney, Agent, or Firm*—Peter J. Bilinski

[57] ABSTRACT

A takeup spool includes a spool core having a film supporting surface and a film-catching member projecting from the film supporting surface for securing the filmstrip to the spool. The spool includes a cutout portion preferably adjacent the film-catching member for maintaining the trailing end of the filmstrip in an undeformed state as the filmstrip is being unwound from the spool. The spool also includes a transitional supporting surface for supporting the leader portion of the filmstrip on the spool core in radial conformity with the remainder of the filmstrip.

11 Claims, 12 Drawing Sheets

FILM SPOOL

FIELD OF THE INVENTION

The invention relates generally to the field of photography, and in particular to an improved takeup spool which is useful for winding and unwinding a filmstrip without significantly deforming the filmstrip during attachment and detachment from the spool, thereby allowing the filmstrip to be more easily removable at a later time by a photofinisher from a film cassette into which the filmstrip is wound.

BACKGROUND OF THE INVENTION

In prewinding type cameras, including many of the so-called "single-use" cameras, a filmstrip is initially prewound from a film cassette which is loaded into a film cassette chamber located in the rear of the camera body onto a takeup spool which is loaded into a film roll chamber oppositely situated across from an exposure gate. The filmstrip is then incrementally exposed at the exposure gate an image frame at a time, and rewound back into the film cartridge.

In known takeup spools, such as those described in commonly assigned U.S. Pat. No. 4,852,821, the leader portion of a filmstrip is introduced and retained within a slotted portion of the spool core, while the remainder of the film is subsequently wound onto the outer peripheral surface of the spool. In spools of this type, an integral tooth-like member is used to retain the leader portion within the slotted core. As the leader portion of the film is unwound from the spool, in order to store all of the film within the confines of the lighttight film cassette, however, it is required that the tooth-like member be broken. Thereafter, the spool cannot be reused without some modification or repair. The preceding aspect is significant, in light of present economic and environmental concerns where it is generally preferred that the spool, like other parts of the camera, be made reusable.

In addition, the trailing end of the leader portion of the film is permanently bent when the film is wound and subsequently unwound from the slotted core of the spool, making later removal of the filmstrip from the film cartridge difficult. This is a persistent problem for the photofinisher trying to unload the film because the deformed end of the leading portion makes removal of the filmstrip from the cartridge door difficult.

Reusable takeup spools, such as those disclosed in U.S. Pat. No. 4,930,712, provide a film catching hook on the outer periphery of the spool core, for engaging a perforation of the leader portion of the film, rather than providing means for engaging the leader portion in the slotted core. Though the attachment of the film to the spool is made easier by the inclusion of an outer film hook, the trailing end of the filmstrip is still caused to bend or otherwise deform during unwinding of the film from the spool, still making later removal of the film from the film cartridge difficult.

Therefore, there is a need to provide a takeup spool, preferably for single-use, but usable in other types of cameras as well, which provides for ease of film attachment and detachment without significant deformation of the trailing end of the filmstrip.

SUMMARY OF THE INVENTION

The present invention is directed to overcoming one or more of the problems set forth above. Briefly summarized, and according to one aspect of the present invention, there is provided a rotatable takeup spool comprising a spool core having an outer peripheral surface for supporting a filmstrip thereon and retaining means for releasably securing the filmstrip to said spool core, characterized in that the spool core includes a cutout portion sized for retaining an end portion of the filmstrip in an undeformed condition as the film is being unwound from the spool.

According to another aspect of the present invention, there is provided a method of winding and unwinding film onto and from a rotatable takeup spool loaded into a camera comprising the steps of:

attaching a leader portion of a filmstrip from a film cartridge loaded into the camera to an engagement member of the spool;

winding the filmstrip onto the takeup spool by rotating the spool in a film winding direction; and unwinding the filmstrip into the film cartridge from the takeup spool by rotating the spool in a film unwinding direction wherein a trailing end of the filmstrip is rotated into a cutout portion of the spool during unwinding as the filmstrip is being detached from the engagement member so as to avoid bending the trailing end of the filmstrip.

According to yet another aspect of the present invention, there is provided a camera comprising a film roll chamber for retaining a rotatable takeup spool and a film cassette chamber for containing a film cartridge having a filmstrip contained therein, wherein the filmstrip is wound and unwound onto and from the takeup spool from and into the film cartridge, the takeup spool having a filmcatching member for releasably securing said filmstrip to said spool, characterized in that:

the takeup spool includes a cutout portion for receiving a trailing end of said filmstrip when the filmstrip is being unwound from said spool so as to avoid bending of the trailing end when the filmstrip is released from said filmcatching member.

An advantageous aspect of the present invention is that the described takeup spool provides for easy film attachment and detachment, while also allowing the film to be wound and subsequently removed from the spool without kinking or overforming of the trailing end of the film. The film can then be more easily removed from a film cartridge by the photofinisher.

Still another advantageous aspect of the present invention is that the improved takeup spool is reusable and therefore recyclable, making it desirable for use in single-use or other recyclable cameras.

These and other aspects, objects, features and advantages of the present invention will be more clearly understood and appreciated from a review of the following Detailed Description of the Preferred Embodiments and appended Claims, and by reference to the accompanying drawings.

DETAILED DESCRIPTION OF THE INVENTION

The present invention is described herein refers according to a preferred embodiment of a takeup spool which is used in conjunction with a recyclable single-use camera, shown in FIGS. 1-4, and described in greater detail below. It will be readily apparent from the description which follows, however, that the present invention should not be solely limited to the preferred single-use embodiment.

THE RECYCLABLE SINGLE USE CAMERA

Figure 1:
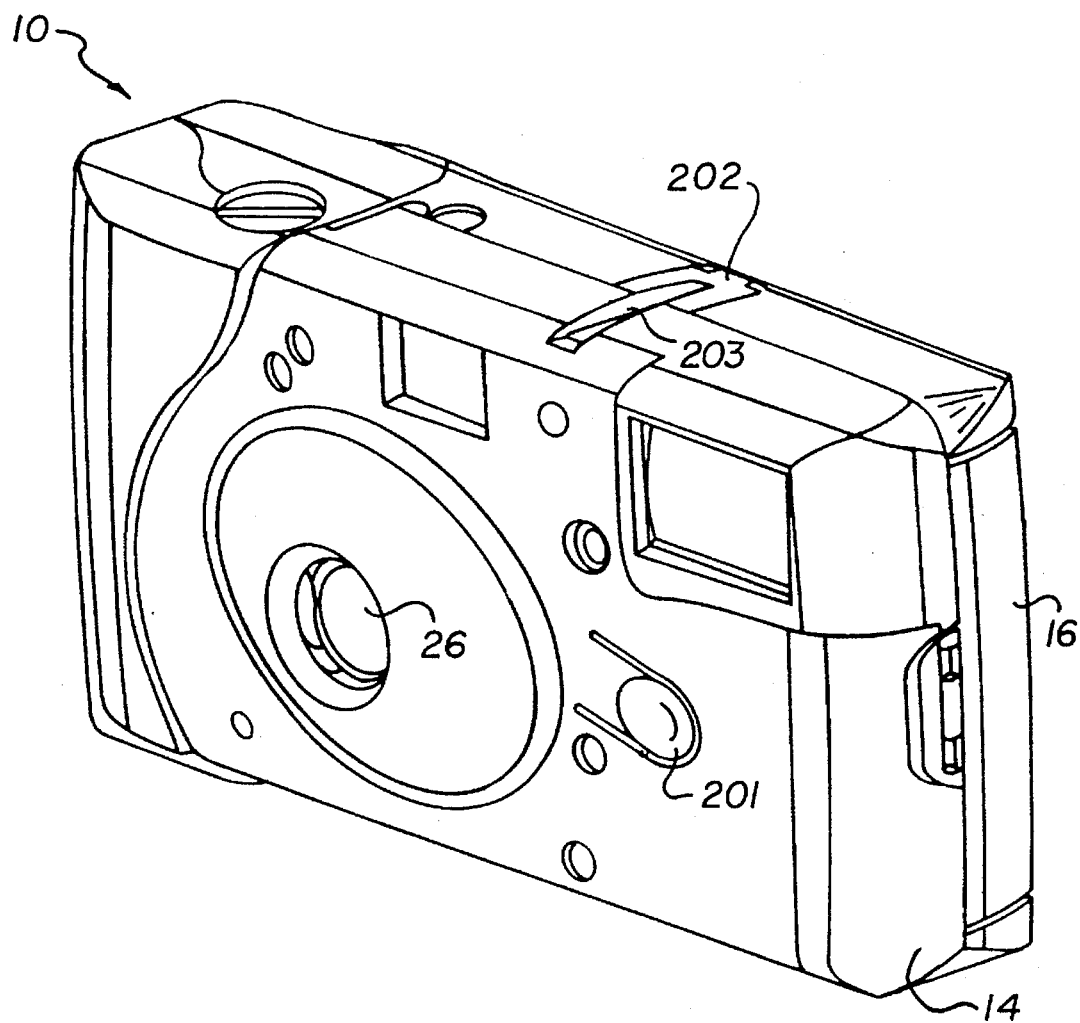
FIG. 1 is a front perspective view of a recyclable single-use camera according to a preferred embodiment of the present invention.
Figure 2:
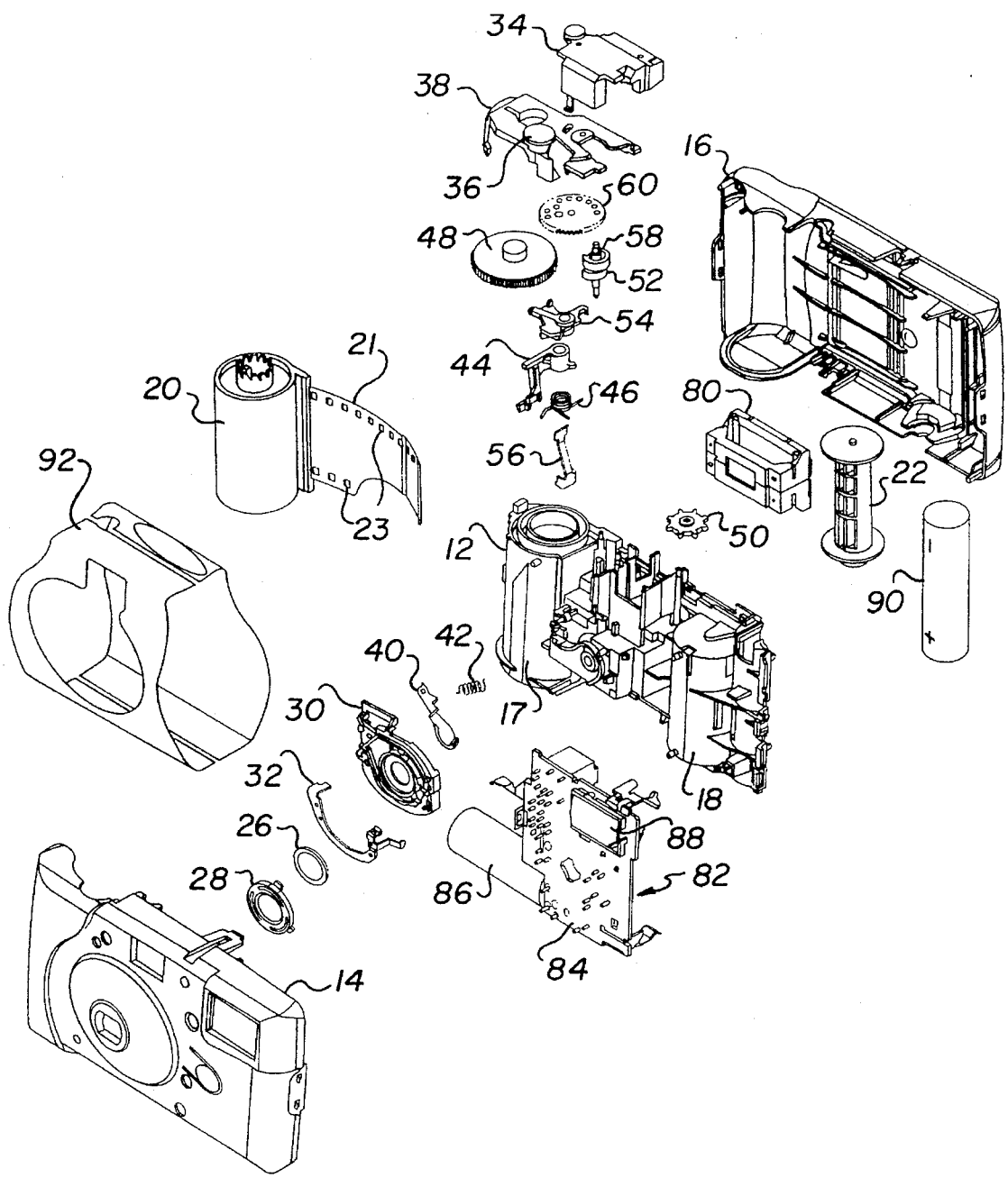
FIG. 2 is an exploded front perspective view of the single-use camera of FIG. 1.

Referring first to FIGS. 1 and 2, an assembled single-use camera 10 utilizing the herein described takeup spool according to this embodiment comprises a main body 12, a front cover 14 which is attached to the front of the main body, and a rear cover 16 that is attached to the rear of the main body. The main body 12, front cover 14 and rear cover 16 are each preferably fabricated from molded plastic parts.

Referring now more particularly to the exploded camera detail shown in FIG. 2, the main body 12 includes a pair of formed chambers 17, 18 sized for retaining a film cassette 20 and a takeup spool 22, respectively. The chambers 17, 18 are oppositely disposed relative to an exposure gate 24, shown in FIG. 4. The body 12 additionally supports a plurality of camera parts which are attached thereto prior to the attachment of the front and rear covers 14, 16 which sandwich the body therebetween. These parts include a taking lens 26 which is attached to the front of the body 12 by means of a retainer 28, and a support plate 30. A contact switch 32 is attached to one side of the support plate 30. Also attached to the body 12 is a plastic viewfinder 34 which may be a one-piece viewfinder comprising a support and two optically aligned lenses, all of which may be molded together from a common material in a single molding process, in accordance with the invention disclosed in commonly owned U.S. Pat. No. 5,353,165. Also attached to the body is a shutter mechanism consisting of a keeper plate 38 having a depressable shutter release portion 36 for tripping a shutter blade 40, which is biased by a spring 42 via a high-energy lever 44 which is also biased by a helical spring 46; a film advancing and metering mechanism consisting of a film winding knob 48 which engages the spool (not shown) of a loaded film cassette 20, a sprocket 50 for engaging edge perforations 23 of the film 21 having a spring biased portion extending into a rotatable cam 52 which engages a metering lever 54 biased by a spring 56, the cam 52 having an extending portion 58 for contacting the teeth of a frame counter 60; a light baffle 80 which is mounted into the rear of the body 12 for diffusing the light entering the camera and into the exposure gate 24, FIG. 4, or alternatively, integrally formed with the body 12 through the taking lens 26 for impinging on the emulsion side 25, FIG. 4, of the filmstrip 21 at the exposure gate 24, FIG. 4; and a flash illumination assembly 82 including a capacitor 86 mounted on the backside of a circuit board 84 and flashhead 88, which is powered by a battery 90. The illumination assembly 82 may include a single touch flashing charging and control circuit as disclosed in the commonly assigned U.S. Patent Application referred to above, the disclosure of which is incorporated by reference. The illumination assembly 82; is made operable, preferably according to the particular embodiment, by a one touch cantilevered portion 201 of the front cover 14, FIG. 1. As noted above, the front and rear covers 14, 16 are sandwiched together with the body 12 by means discussed subsequently. A decorative label 92 may be subsequently attached to the finished camera 10 to deter a user from opening the camera and provide a convenient place for product identification and operational information.

For a variety of reasons, including economic efficiency and environmental concerns, single use cameras, such as the described camera 10, are designed to be recycled by the manufacturer after a purchaser has completed exposing the loaded film and turned the film over to a photofinisher for development of the film. See, for instance, U.S. Pat. No. 5,329,330 to Sakai, et al. Therefore, certain parts of the camera are designed to last through a suitable number of cycles of sale, use, reconstruction, and resale. Conversely, for quality reasons, among others, certain parts should be replaced each time a camera is reconstructed. To successfully recycle cameras, it is important to know when particular reused camera parts should no longer be utilized because, for example, they have reached the end of their useful life. Thus, each time a camera is recycled, as described in detail below, a mark on the camera body and/or flash mechanism may be made in accordance with commonly owned U.S. Pat. No. 5,021,811 (the disclosure of which is incorporated by reference herein) to indicated the number of times it has been reconstructed.

Figure 3:
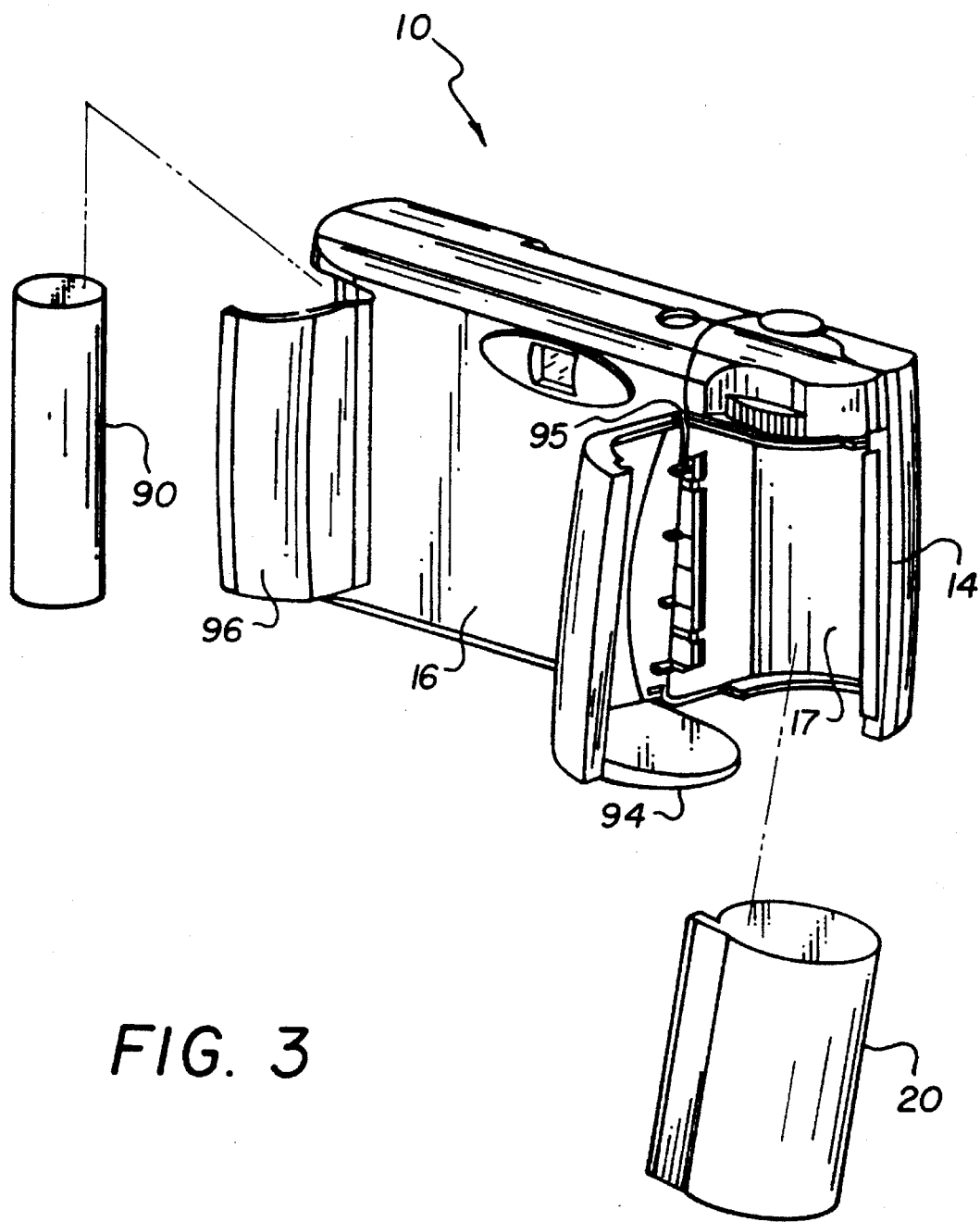
FIG. 3 is a rear perspective view of the camera of FIGS. 1 and 2, showing the removal of the film cartridge and flash battery from the rear of the camera.

An efficient recycling program requires a number of competing concerns to be reconciled. In general, the manufacturer/recycler wants to facilitate easy access to the exposed film when removed by the photofinisher. This insures that the reusable components are not damaged. On the other hand, access to the interior of the camera by the consumer/photographer is undesirable because it increases the risk of damage to and/or contamination of the interior of the camera 10 and its reusable components. These considerations are resolved by the particular design of the door 94 provided on the rear cover 16, as shown in FIG. 3, to access the film chamber 17. To facilitate recycling without damage to the camera, the door 94 may be attached to the rear cover by a living or flexible hinge integrally formed as a groove 95 or a reduced thickness portion of the cover. An example of a living hinge in a film cassette door is disclosed in commonly owned U.S. Pat. No. 5,255,041, the disclosure of which is incorporated by reference herein. Alternatively, the door 94 may be connected to the rear cover 16 by a frangible connection integrally formed herewith and designed to break away from the remainder of the rear cover. In either case, the opening of the door 94 provides access to the film cartridge 20 without damaging or exposing the camera parts attached to the camera body 12. Similarly, a second door 96 can also be provided in the rear cover 16 to be flexibly opened or broken away by the photofinisher to remove the flash battery 90, if desired. See FIG. 3.

Figure 4:
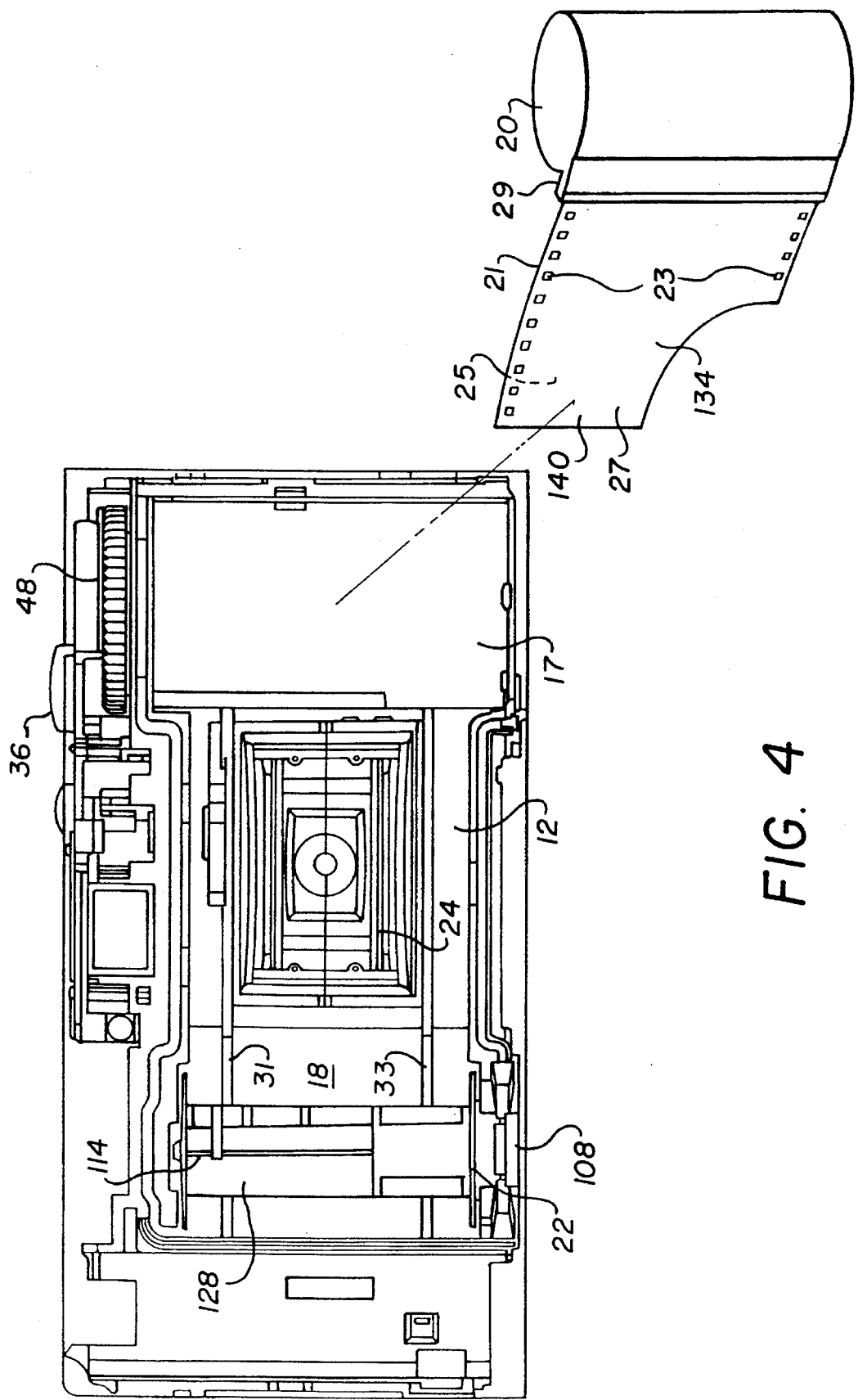
FIG. 4 is a partial rear view of the body of the camera of FIGS. 1–3.

Referring now to FIG. 4, the rear of the camera body 12 is shown with the rear cover 16, FIG. 2, removed, illustrating the exposure gate 24 and the formed chambers 17, 18, which are oppositely disposed about the exposure gate 24, and used for retaining the film cassette 20 and the takeup spool 22, respectively. A pair of film rails 31, 33 disposed on either side of the exposure gate 24 provide a film transport path for the filmstrip 21 between the chambers 17, 18. When the rear cover 16, FIG. 2, of the camera 10 is closed against the rear of the camera body 12 so as to enclose the film in a lighttight manner, the filmstrip 21 is maintained along the film transport path and also within the image plane.

The photographic filmstrip 21, includes an emulsion side 25 and a non-emulsion side 27 as is commonly known, and is attached to a rotatable spool (not shown) contained within the cartridge 20. A series of adjacent perforations 23 are located on either edge of the film. The filmstrip 21 also includes a leader portion 134 extending from the snout end 29 of the film cartridge 20, having a tapered profile from a trailing end 140 to the remainder of the filmstrip 21, also common to other known photographic filmstrips.

RECYCLING OF THE DESCRIBED CAMERA

When turned over to the manufacturer the camera 10 is recycled, as will now be described with reference to the above FIGS. 1–4. The recycling process may comprise the following steps: First, the front cover 14 and rear cover 16 may be detached from the camera body 12. It should be readily apparent that the covers 14, 16 and body 12 may utilize a number of means for attaching the structural parts together; for example, hook and/or press fitting members may be used, or the parts can be ultrasonically welded together. Thus, each cover may have a suitable number of conventional releasable hook structures (one of which is shown at 202, 203) or other attachment means for allowing removal of the covers from the body. The covers may be made from a recyclable plastic such as polystyrene and can be sent to be pulverized. The pulverize material may be blended with virgin materials and new covers or other parts molded therefrom.

The taking lens 26, and light baffle 80 (unless integrally molded with the body 102) also are removed. The taking lens 26 also may be similarly pulverized with other lenses, blended with virgin materials, and new lenses made therefrom. The takeup spool 22 may also be removed temporarily prior to reloading a filmstrip into the camera 10.

Other parts, typically more costly components designed to be reused, such as the main body 12 and the major parts supported by the body, e.g., the viewfinder 24, shutter mechanism, film advancing and metering mechanism, and flash illumination assembly 82 may be examined carefully for wear or damage. Those parts deemed damaged or worn may be removed from the body 12 and replaced with new parts. Those remaining reusable parts, such as the camera flash assembly 82, shutter mechanism etc., that can be reused remain supported by the camera body, for construction into a camera 10.

A new front cover 14 is then fitted to the front face of the body 12 and an unexposed roll of film 21 contained within a fresh cassette 20 is loaded into the film cartridge chamber 17. A leading portion 134 of the film 21 contained with the cassette 20 is then engaged with the improved takeup spool 22, which is placed within the body chamber 18, in a manner described below. A new rear cover 16 is then snapped, or otherwise attached, onto the rear of the camera body 12 and/or to the front cover 14 by any of the attachment means discussed above.

A less rigorous but not preferred recycling process may be employed in which the covers 14, 16 are not replaced with new parts. In this case, the camera would be inspected visually after the back cover is removed. If the camera 10 was deemed reusable as a whole, a new filmstrip 21 then would be reloaded into the film chamber and attached to the takeup spool 22 for prewinding. The rear cover 16 then would be reattached to the camera body 12 and/or front cover.

In either case, the filmstrip 21 may be then prewound onto the takeup spool 22, which is supported for rotation in chamber 18 so that the film is wound back into the cassette 20 as the film is being exposed. A limited torque electric screwdriver or other tool may be used to prewind the film onto the prewind spool. If a new takeup spool 22 is not provided and if the exposed end of the takeup spool 22 previously was deformed to prevent reuse of the spool for prewinding purposes, sufficient heat and/or pressure must be applied to rotate the spool. The details pertaining to prewinding of the filmstrip 21 onto the takeup spool 22 of the present invention is described below.

At least one wind and trip check (film advance and shutter actuation) may be done to simulate taking a picture, thereby bringing the counter down to 24 (assuming a 24 exposure roll). The camera 10 then may be inserted into a cardboard casing or a label, such as 92, attached thereto by adhesive. The recycled camera then may be humidity sealed in a foil wrap, plastic bag or the like, and packaged in an outer cardboard box (not shown) for sale. The recycled single use camera 10, utilizing previously used single use camera parts, such as the takeup spool 22, is now ready for use.

THE TAKEUP SPOOL

Figure 5:
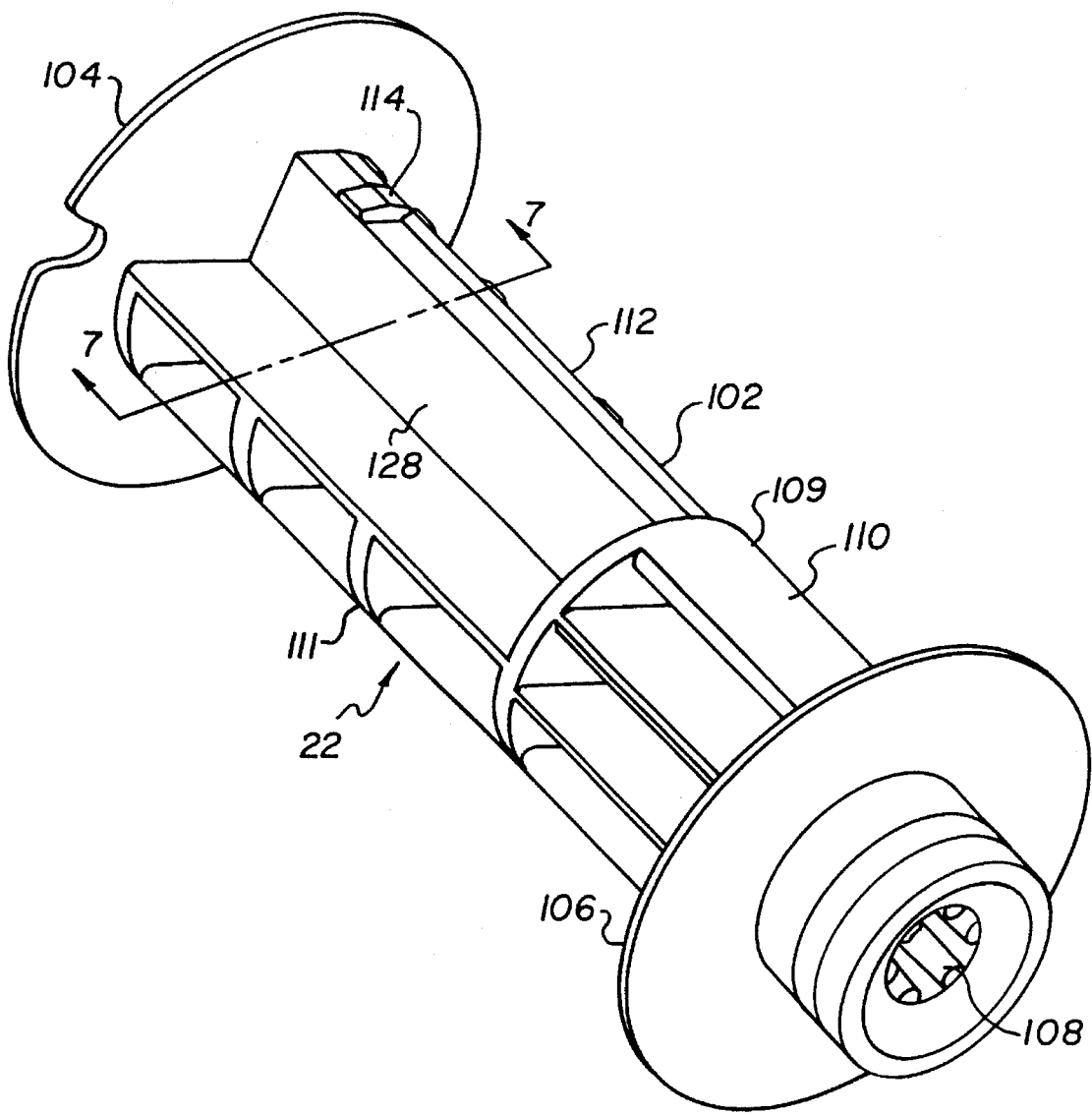
FIG. 5 is an isometric view of an improved takeup spool which is useful in the camera of FIGS. 1–4.
Figure 6:
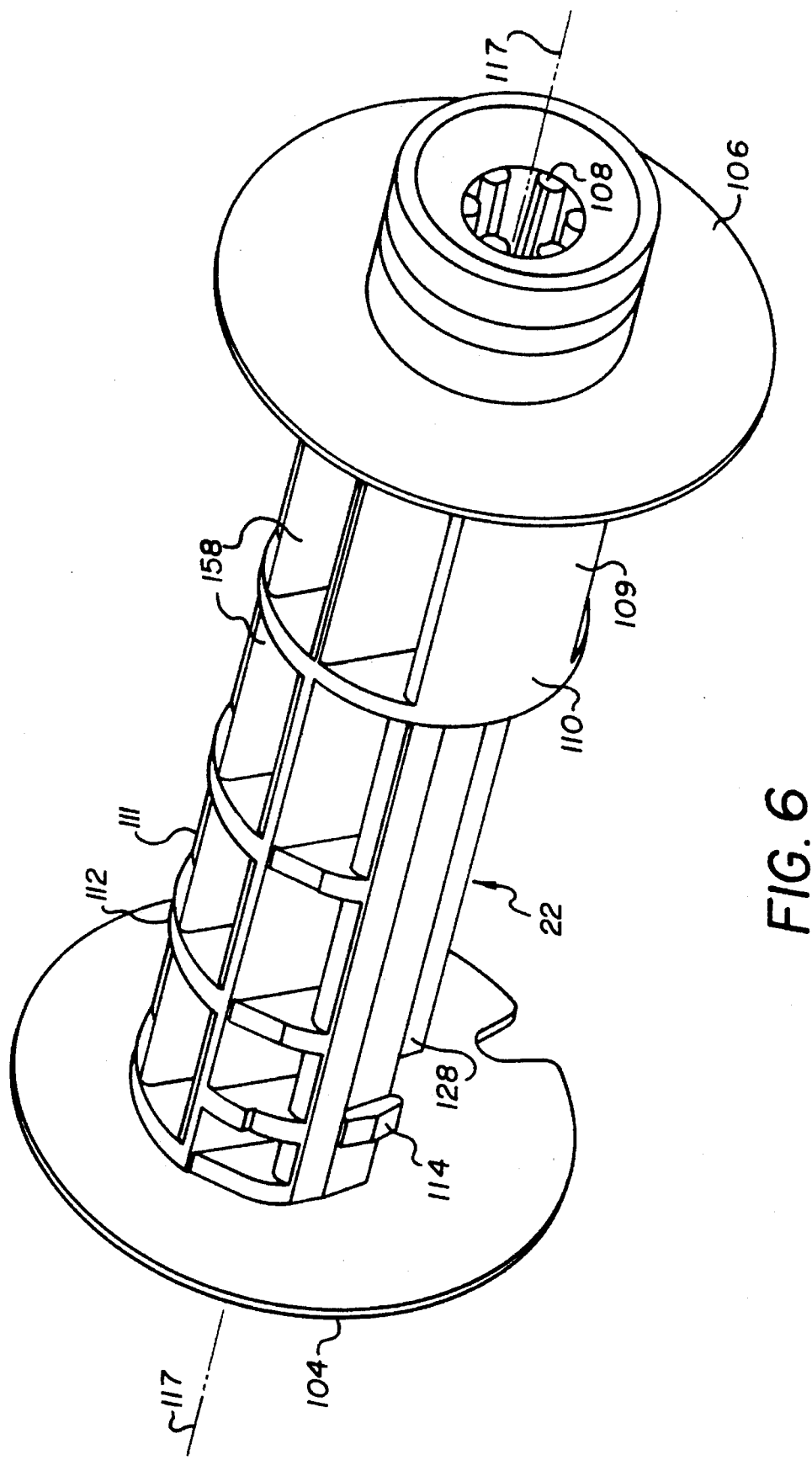
FIG. 6 is the isometric view of the takeup spool of FIG. 5, rotated counterclockwise by 90 degrees.
Figure 8:
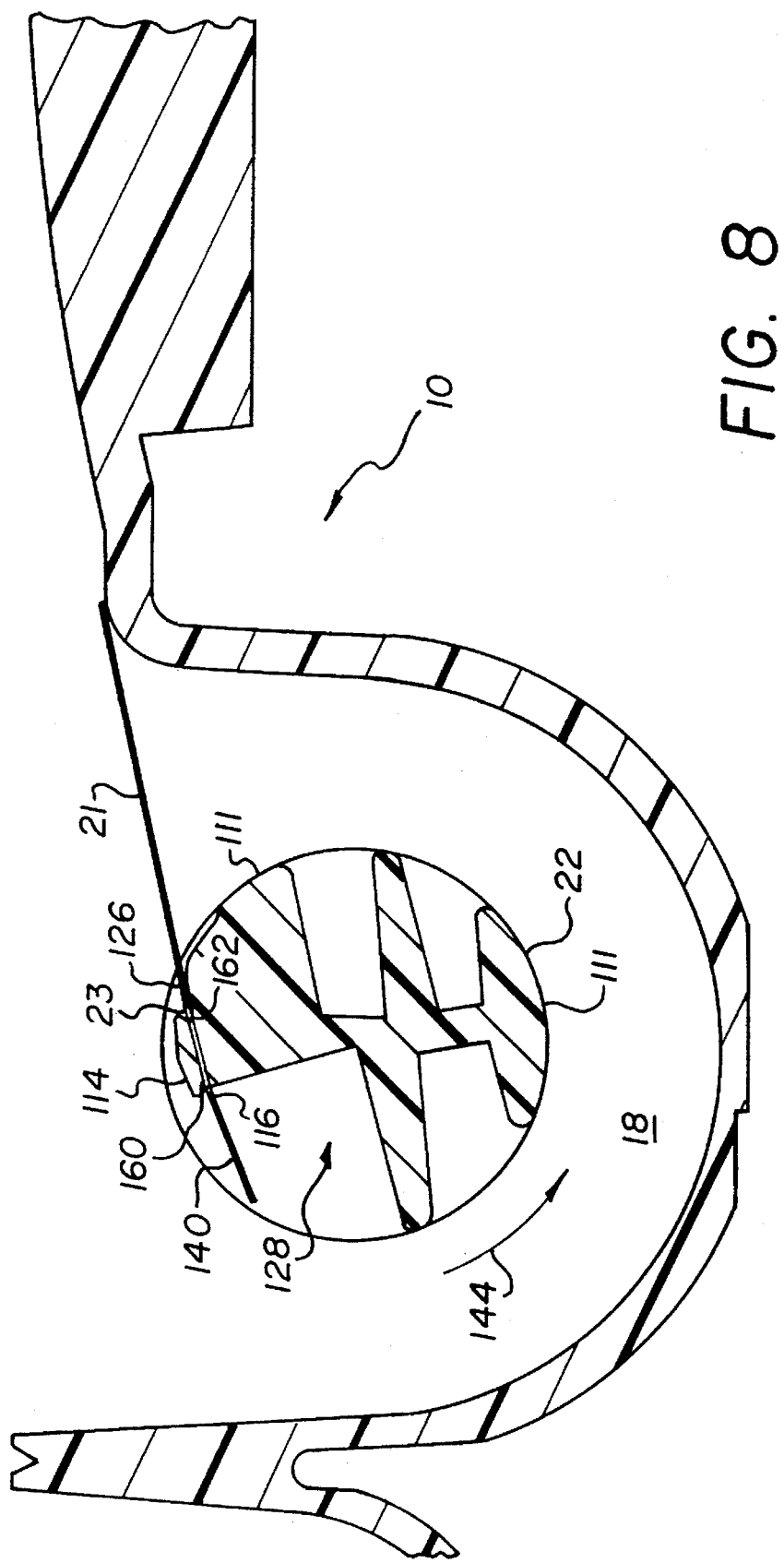
FIG. 8 is a partial bottom sectional view of the camera of FIGS. 1–4 showing the initial winding of the leader portion of a filmstrip onto the takeup spool of FIGS. 5–7.

Referring now to FIGS. 5 and 6, the improved takeup spool 22, partially shown in FIG. 4 and according to this preferred embodiment, includes a spool core 102 made up of two primary areas; specifically, a major core region 110 and a minor core region 112. A pair of end flanges 104, 106 bound the two ends of the spool core 102 and support the ends of a cylindrical film roll as the filmstrip 21, FIG. 8, is wound onto the spool core 102. At one end of the spool 22 and adjacent one of the end flanges 106, a mold coring hole 108 having a star-like or other pattern, is sized for engagement with the previously referred to limited torque electric screwdriver, or with other suitable drive mechanisms (not shown), for allowing the spool 22 to be rotated in either a clockwise or counterclockwise direction about a primary axis 117 for winding or unwinding film therefrom.

Still referring to the spool core 102, the major core region 110 and coaxially arranged minor core region 112 each include outer peripheral surfaces 109 and 111, respectively. A number of slotted regions 158 are provided throughout the spool core 102, mainly to reduce the weight of the spool 22, which does not require additional structural material in order to function.

A film-catching hook-like member 114 radially projects from the outer peripheral surface 111 of the minor core region 112. In addition, the minor core region 112 also includes a cutout portion 128, which is adjacent the film-catching member 114. Each of the above spool features are described in greater detail below.

Figure 7:
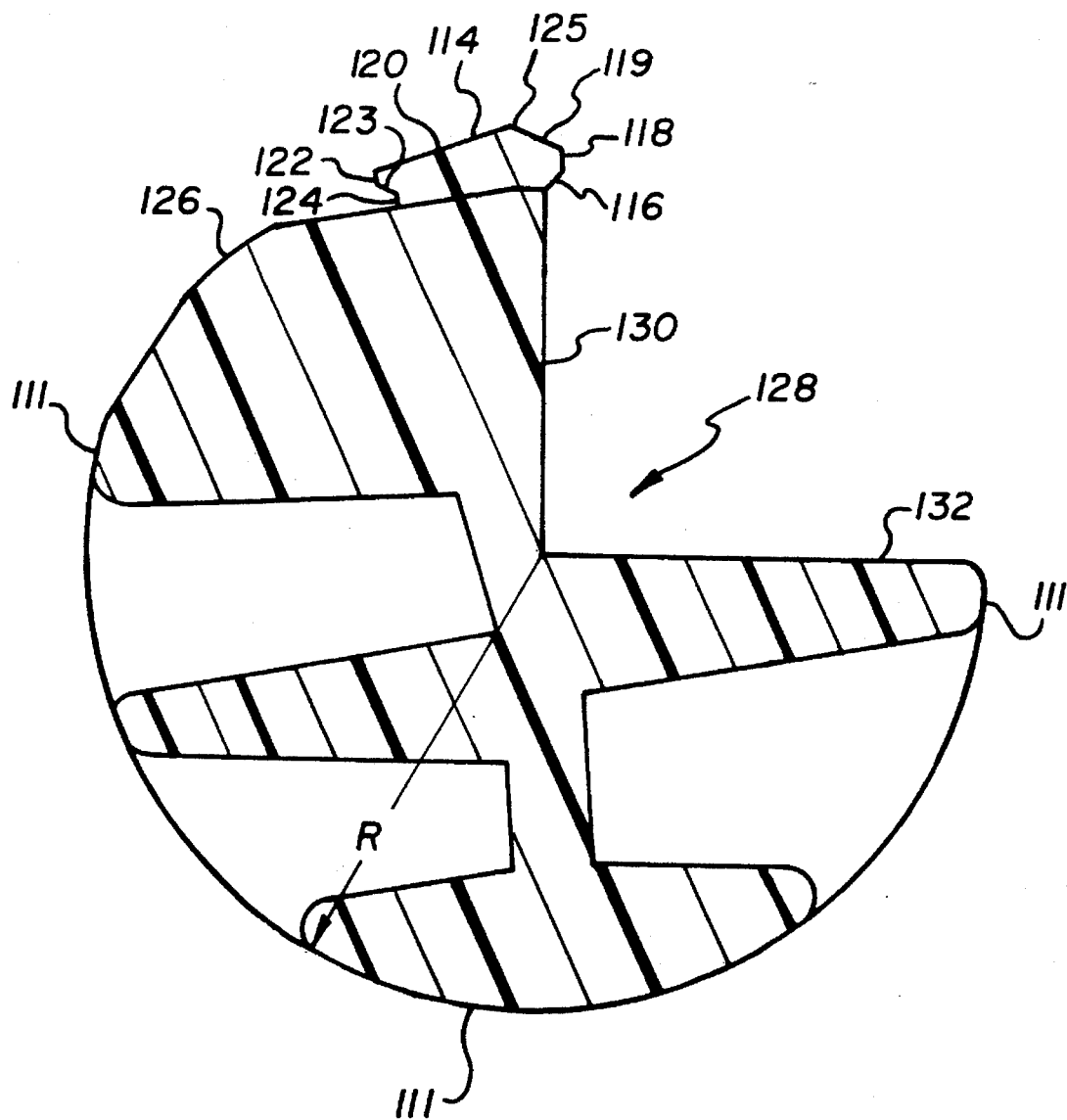
FIG. 7 is a cross sectional view of the takeup spool of FIGS. 5 and 6 taken through line 7—7 of FIG. 5.

The annular outer peripheral surface 109 of the major core region 110, FIG. 6, is preferably defined by a constant radius, shown as R in FIG. 7, over the entirety of its circumference. According to this embodiment, the radius R is equal to about 11 mm, though this parameter can be easily varied. The outer peripheral surface 111 of the minor core region 112, as seen most clearly in the bottom sectional view of FIG. 7, is also defined by the constant radius R (approximately 11 mm) over a substantial portion of its circumference. Each of the surfaces 109, 111 provide film supporting surfaces for the filmstrip 21.

Referring specifically now to FIG. 7, the outer peripheral surface 111 also preferably includes a transitional portion 126, having a gradual variable radius profile which is at least equal to or smaller than the radius R. A portion of the cutout portion 128, as well as the supported film catching member 114, are included within the described transitional portion. Providing a transitional portion as described allows the leader portion 134 of the filmstrip 21 to be wound onto the outer peripheral surface 111 of the minor core region 112, so that the remainder of the filmstrip 21 can then be wound in radial conformity onto the pool core 12.

Still referring to FIGS. 6 and 7, the filmcatching member 114, according to this embodiment, is located adjacent the end flange 104, and is sufficiently spaced therefrom for engaging one of the edge perforations 23 of the leader portion 134 when the filmstrip 21 is attached to the spool 22, as shown in FIG. 8, in the manner described below.

Referring to FIG. 7, the cutout portion 128 includes a pair of surfaces 130 and 132, which in this embodiment are substantially orthogonal to each other, forming a cavity in the spool core 102 having length and depth dimensions which are sized to fit the trailing end 140 of the filmstrip 21. In the present embodiment, the cutout portion 128 extends over the entire length of the minor core region 112.

The film-catching member 114 includes a beveled surface 116 which depends from and extends outwardly from the cutout surface 130 to an edge 118. A pair of exterior surfaces 119, 120 depend from the radially outermost end of the edge 118 and a opposite corresponding edge 122. Extending inwardly from the radial innermost end of the edge 122 is another beveled surface 123 extending inwardly and downwardly from the edge 122 to a connecting surface 124 which extends to the transitional portion 126 of the spool core 102. According to this embodiment, one of the exterior surfaces 120 is slightly longer than the other exterior surface 119, the two surfaces forming an apex 125 at their intersection point. In addition, the film-catching member 114 has a length dimension, in this case measured from the edge 118 to surface 124, which is larger than a corresponding length dimension of an edge perforation 23, FIG. 4.

The operation of the present invention will now be described as film is wound onto and unwound from the takeup spool.

ATTACHMENT OF THE FILMSTRIP TO THE TAKEUP SPOOL

Figure 9:
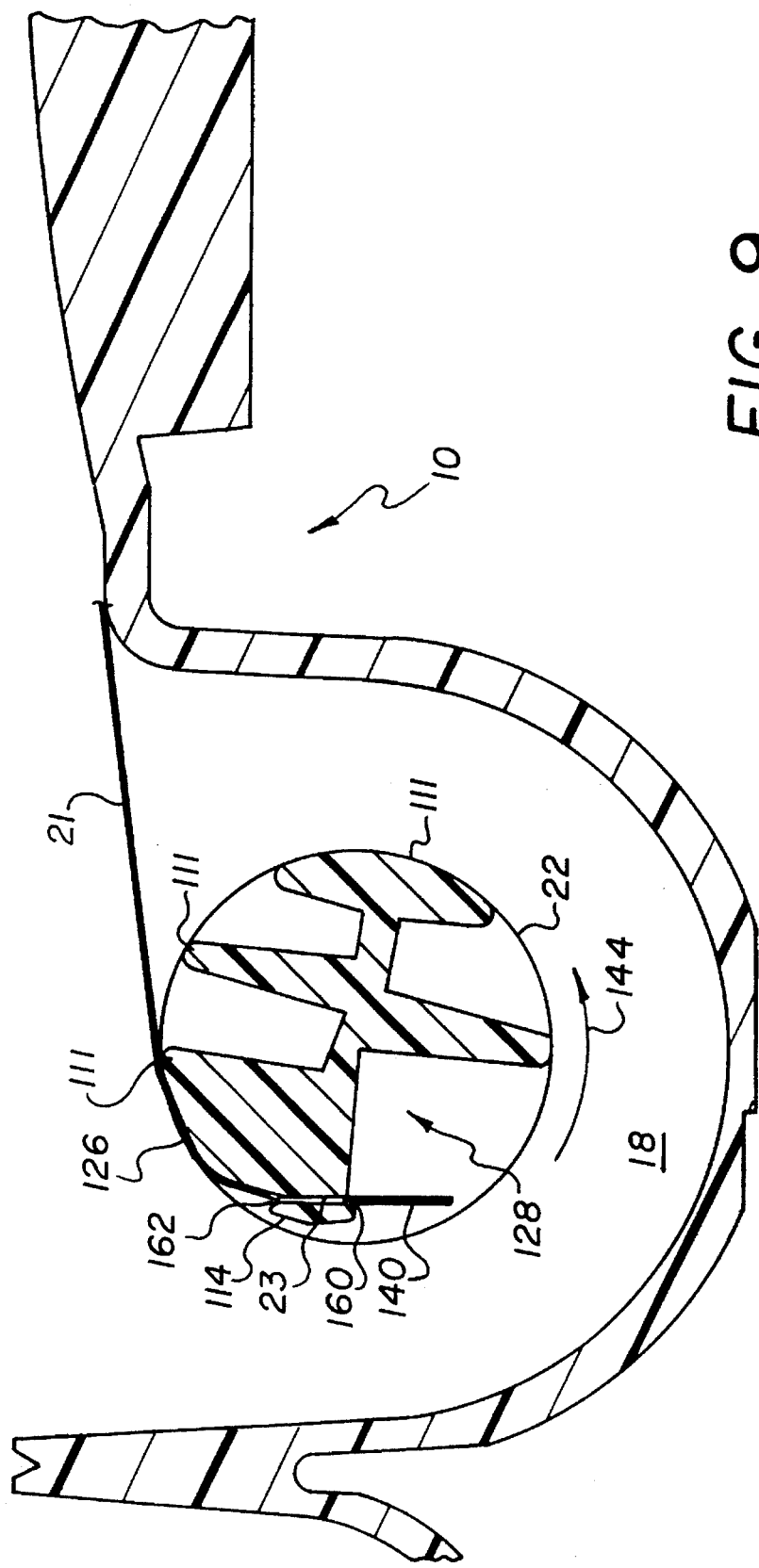
FIG. 9 is the partial bottom sectional view of FIG. 8, showing the winding of the leader portion of the film onto a transitional surface of the takeup spool.

Referring to FIGS. 4, 8 and 9, once the film cartridge 20 is loaded into the film cassette chamber 17, FIG. 4, the leader portion 134 of the filmstrip 21 is extended from the snout end 29 of the cartridge 20, FIG. 4, and is attached to the spool core 102 by engaging the first or leading edge perforation 23 of the leader portion 134 with the film catching member 114. As noted previously, the edge perforation 23 has a length dimension which is slightly less than the corresponding length dimension of the film catching member 114, as measured from edge 118 to surface 124. This difference in length insures that the filmstrip 21 remains engaged to the takeup spool 22 as the edge perforation 23 is snapped over the film catching member 114. The filmstrip 21, being made from a flexible and resilient material, allows minor elastic deformation in the vicinity of the engaged perforation. In the particular embodiment, a front edge 160, FIG. 8, of the edge perforation 23 is placed over the beveled surface 116 while the back edge 162, FIG. 8 is snapped over the exterior surface 120 and edge 122, thereby retaining the edge perforation 23 between surfaces 116 and 124, FIG. 7. In passing, it should be noted that the bevel of surface 116 aids in film disengagement from the spool core 102, and more particularly the film catching member 114, as is described more completely below.

Once the filmstrip 21 has been attached to the spool 22, and another of the edge perforations 23 has been engaged with the sprocket wheel 50, FIG. 2, as is commonly known to allow advancement of the filmstrip, the rear cover 16 is attached to the rear of the camera body 12, such as by snap attachment members 202, 203, FIG. 1, to provide a lighttight receptacle for the film 21 prior to prewinding the film from the film cartridge 20 onto the takeup spool 22. A preferred rear cover and attachment arrangement is described in the previously incorporated and commonly assigned U.S. patent application Ser. No. 08/327,258 entitled: COVER ASSEMBLY FOR A CAMERA, by James D. Boyd.

In order to prewind the filmstrip 21 and referring to FIGS. 8 and 9, the spool 22 is rotated in a counterclockwise direction, by engaging the torque screwdriver into the mold coring hole 108, FIG. 4, of the spool 22, as accessed through the external access hole not shown in the covers 14, 16 of the camera 10. As the takeup spool 22 is rotated, the filmstrip 21, and particularly the front edge 160 of the edge perforation 23, is continually engaged with the surface 116 of the film catching member 114, allowing the remainder of the filmstrip 21 to be wound about the spool core 102, FIG. 9. In addition, because the film catching member 114 projects from the transitional portion 126 of the outer peripheral surface 111, the radius of the film catching member 114 at the apex 125 is at least equal to or smaller than the radius R. This radial difference allows the remainder of the filmstrip to be wound onto the spool in radial conformity with the leader portion 134. A cover, which can be part of the decorative label 92, FIG. 2, can be added to block the external access hole 108, FIG. 2, 4, after the filmstrip 21 has been prewound onto the takeup spool 22.

DETACHMENT OF THE FILMSTRIP FROM THE TAKEUP SPOOL

Figure 10:
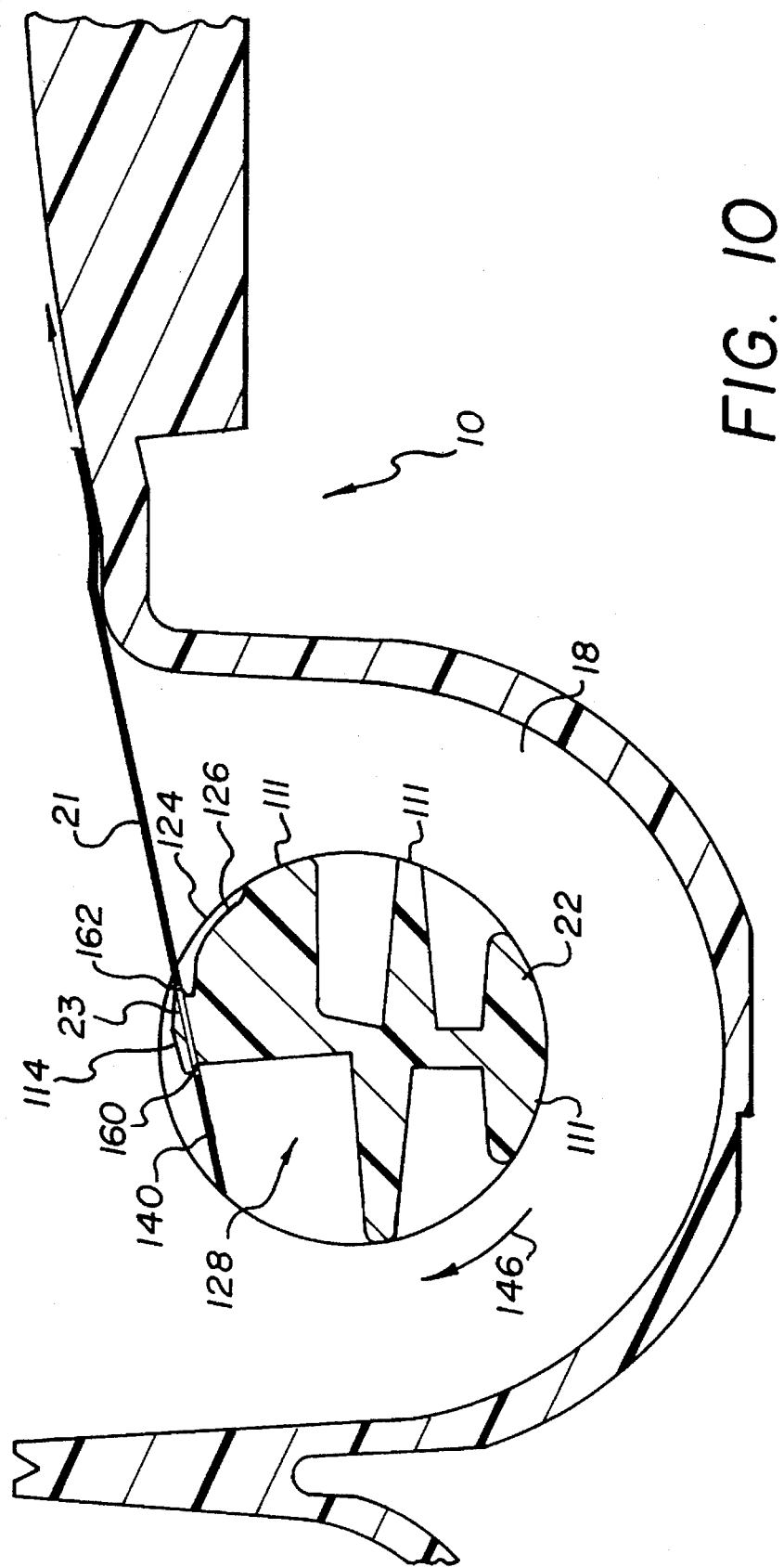
FIG. 10 is the partial bottom sectional view of FIGS. 8 and 9 showing the unwinding of the leader portion of the film from the takeup spool.
Figure 11:
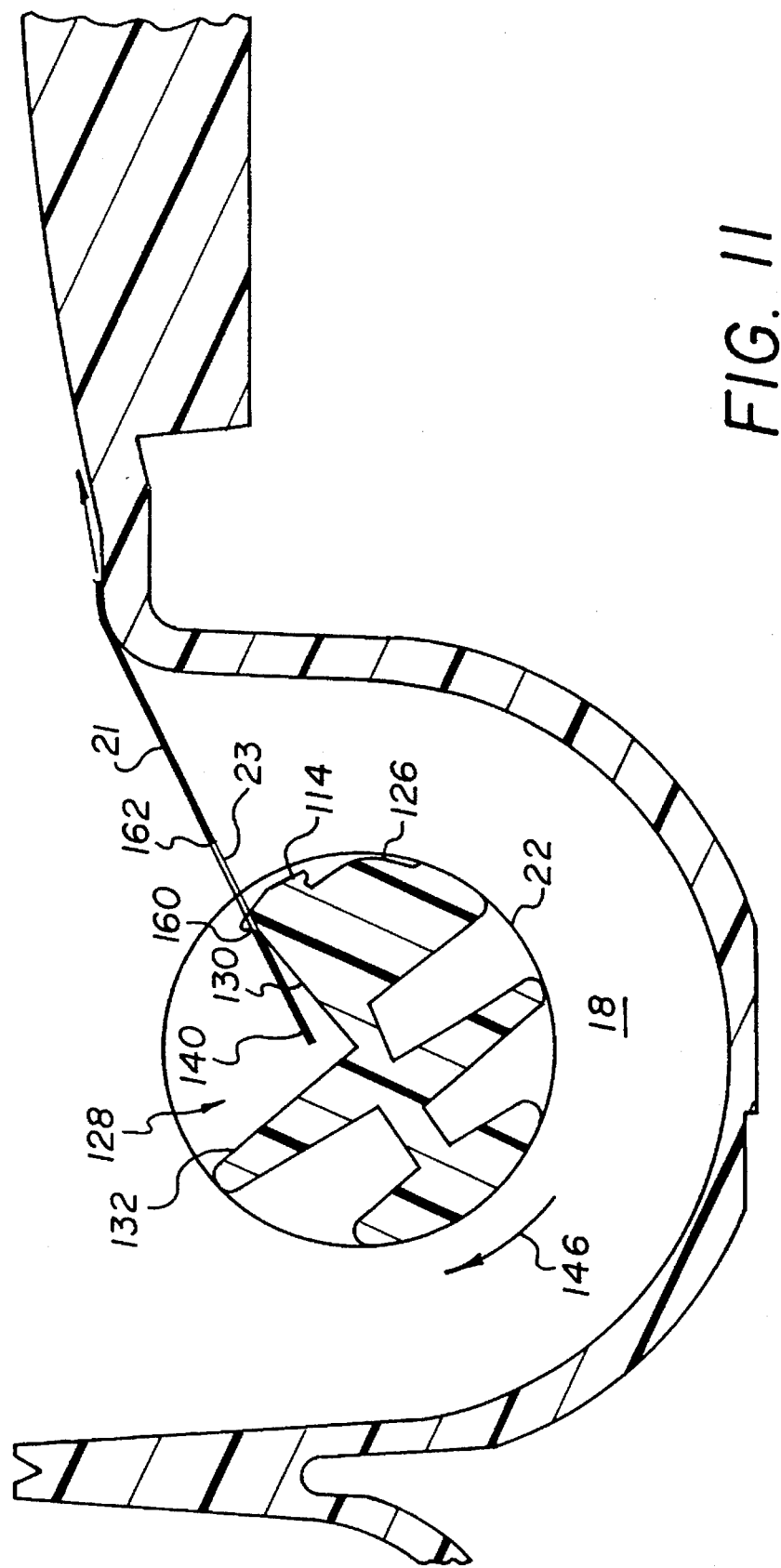
FIG. 11 is the partial bottom sectional view of FIGS. 8–10 showing the detachment of the trailing end of the leader portion of the filmstrip from the takeup spool.

Referring now to FIGS. 10–11, the unwinding of the filmstrip 21 from the described takeup spool 22, including the detachment of the leader portion 134 from the film catching member 114, is herein described.

Following prewinding onto the takeup spool 22, such s in the manner described above, the filmstrip 21 is advanced in a frame by frame manner (not shown) from the takeup spool 22 across the exposure gate 24, FIG. 4, where a portion of the film is exposed, and subsequently into the body of the film cartridge 20 contained in the film cassette chamber 17. A variety of known means can be used to advance the filmstrip 21. According to this embodiment and referring to the camera body of FIG. 4, the filmstrip 21 is advanced by rotating the film winding knob 48 in a counterclockwise direction which causes an attached fork member to engages the cartridge spool (not shown) in a counterclockwise direction, thereby drawing film 21 into the film cartridge 20 from the takeup spool 22. The film is metered in a frame by frame manner across the exposure gate 24 and exposed by depression of the shutter release button 36 in a manner conventionally known.

After all frames of the filmstrip 21 have been exposed across the exposure gate 24, FIG. 4, subsequent advancement of the film winding knob 48 in the counterclockwise direction serves to detach the remainder of the filmstrip 21 from the spool 22, and particularly the leader portion of the film 134, from the film catching member 114. As previously noted, this detachment from the takeup spool 22 is required in order to preserve the lighttight integrity of the cartridge 20 by drawing all of the film into the body of the cartridge for later removal for processing by the photofinisher. The mechanics of the detachment of the filmstrip 21 from the spool 22 follow.

FIG. 10 illustrates a bottom crosssectional view of the takeup spool 22 as taken through the minor core region 112, showing only the leader portion 134 remaining attached to the spool 22, the remainder of the filmstrip 21 having already been unwound from the spool 22 by the means described above. Due to the convention of the FIGS., the spool 22 is shown here as rotating in a clockwise direction, arrow 146, in response to the rotation of the cartridge spool (not shown). It should be noted that the spool 22 is not itself being driven, but is only caused to rotate in response to the pulling of filmstrip 21 from the spool core 22 by the film cartridge 20.

Referring now to FIGS. 10 and 11, as the spool core 102 continues to rotate, the leader portion 134 of the filmstrip 21 is pulled from the transitional portion 126 and gradually the back edge 162 of the edge perforation 23 is pulled or rotated over the surfaces 123, FIG. 7, and 122, FIG. 7, of the film-catching member 114, FIG. 10. At the same time, the front edge 160 of the edge perforation is engaged with the beveled surface 116.

As the spool 22 continues to rotate per arrow 146, the trailing end 140 is pivoted about beveled surface 116 and into the cutout portion 128, FIG. 11. By providing a cutout portion 128 as described, the trailing end 140 of the filmstrip 21 is not bent or otherwise deformed during detachment from the spool 22. Furthermore, due to the bevel of surface 116, the filmstrip 21 preferably slips off of the film-catching member 114 before contacting with surface 130. A bevel of about 45 degrees is adequate for this embodiment to help insure the film is not bound up on the film catching member 114 during detachment. The angular position of cutout surface 130 can be varied, depending on the length of the trailing end 140 of the filmstrip, though it is preferred that the perforation 23 clear the film-catching member 114 before the filmstrip 21 contacts the surface 130.

Figure 12:
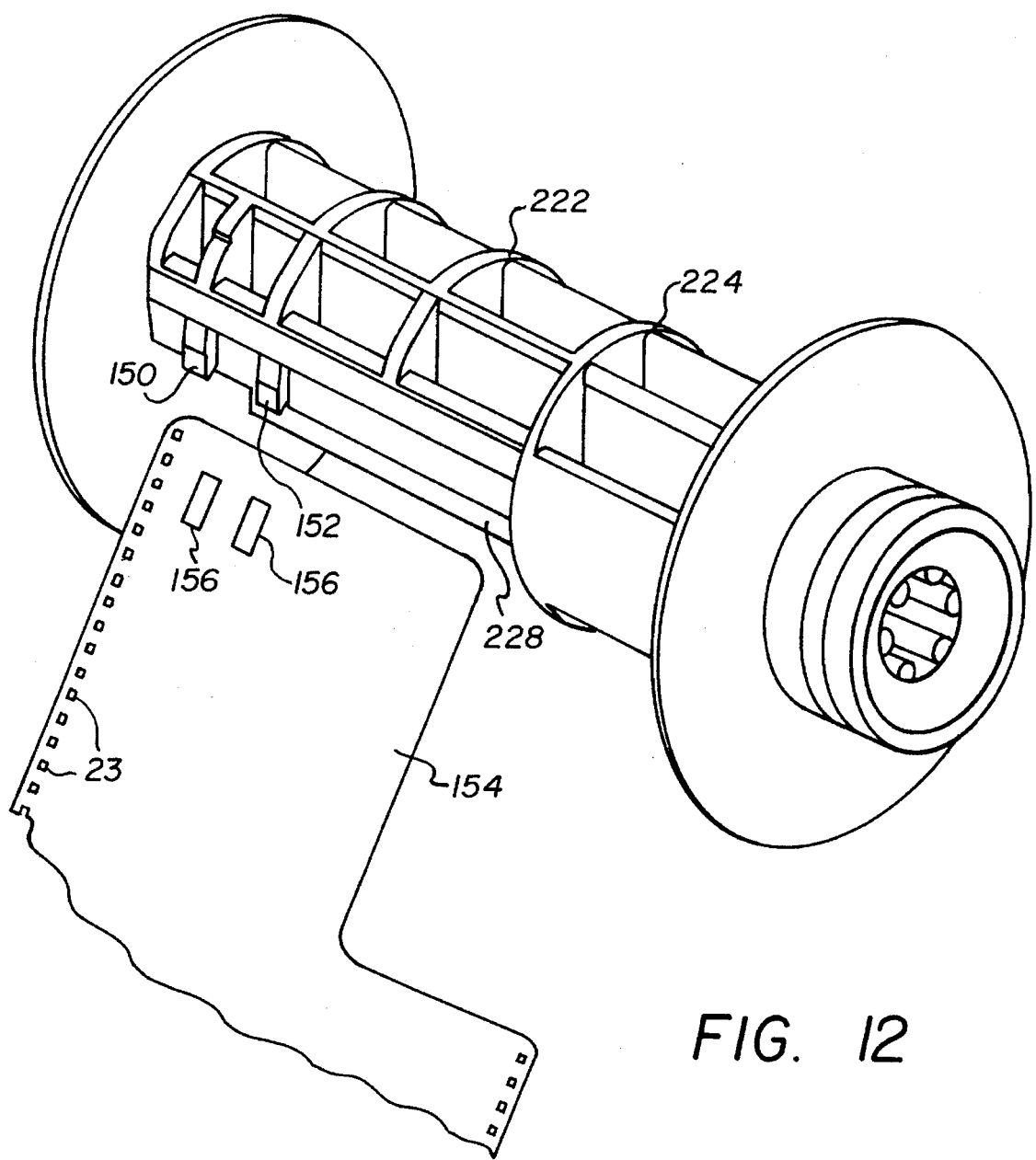
FIG. 12 is an alternate embodiment of an improved takeup spool according to the present invention.

Referring to FIG. 12, the takeup spool 222 according to the present invention is shown in FIG. 12, wherein a pair of spaced hook members 150, 152 can be provided on the spool core 224 in lieu of a single film-catching member, for engaging a filmstrip 154 having a pair of centrally leader perforations 156 which can be provided in place of having engagement with an edge perforation 23. As should be readily apparent, a similar cutout section 228 receives the trailing end of the filmstrip 154 as the filmstrip is being detached from the hook members 150, 152 at the end of the film roll. Other variations utilizing the same inventive concept are possible.

In addition, the film-catching member 114 and the minor core portion 112 of the first described embodiment are provided at one end of the spool 10, these positions can be easily varied anywhere along the longitudinal length of the spool, depending on the orientation of the leader portion of a particular filmstrip.

It will be appreciated that variations and modifications can be affected by a person of ordinary skill in the art without departing from the scope of the invention. For example, it should be readily apparent that still other attachment arrangements for arranging the filmstrip 21 with other film retaining means are possible.

PARTS LIST FOR FIGS. 1–12

10 camera
12 main body
14 front cover
16 rear cover
17 film cassette chamber
18 film-roll chamber
20 film cassette
21 filmstrip
22 takeup spool
23 edge perforations
25 emulsion side
27 non-emulsion side
24 exposure gate
26 taking lens
28 retainer
29 snout end of film cartridge
30 support plate
31 film rail
32 contact switch
33 film rail
34 viewfinder
36 shutter release portion
38 keeper plate
40 shutter blade
42 spring
44 high-energy lever
46 helical spring
48 film winding knob
50 sprocket
52 cam
54 metering lever
56 spring
58 extending portion
60 frame counter
80 light baffle
82 flash illumination assembly
84 circuit board
86 capacitor
88 flash head
90 flash battery
92 label
94 film door
96 hinged door
98 battery compartment
102 spool core
104 end flange
106 end flange
108 mold coring hole
109 outer peripheral surface 110 major core region
111 outer peripheral surface
112 minor core region
114 film catching member
117 primary spool axis
116 beveled surface
118 edge
119 exterior surface
120 exterior surface
122 edge
123 beveled surface
124 connecting surface
125 apex
126 transitional surface
128 cutout portion
130 cutout surface
132 cutout surface
134 leader portion
140 trailing end of film
144 arrow
146 arrow
150 hook member
152 hook member
154 filmstrip
156 leader perforations
158 slotted regions
160 perforation edge
162 perforation edge
201 single touch flash button
202 hook engaging portion
203 hook engaging portion
222 spool
224 spool core

We claim:

1. A rotatable film spool for winding and unwinding a filmstrip comprising a spool core having an outer peripheral surface for supporting the filmstrip and a film-catching member radially projecting from said outer peripheral surface for securing the filmstrip to said spool, is characterized in that:

said spool core includes a cutout portion adjacent said film-catching member sized for retaining an end portion of the filmstrip in an undeformed condition when said filmstrip is being unwound from said spool, wherein said film-catching member includes a film retaining portion which extends into said cutout portion for retaining the filmstrip on said spool after the end portion of the filmstrip has been secured thereto.

2. A takeup spool as recited in claim 1, wherein the outer peripheral surface includes a transitional portion having a variable radius which is at least equal to or smaller than the radius of the remainder of the outer peripheral surface.

3. A takeup spool as recited in claim 3, wherein said film catching member radially projects from said transitional portion and includes an exterior surface having a radius equal to or smaller than the remainder of the outer peripheral surface for allowing the filmstrip to be wound onto said spool core in radial conformity.

4. A takeup spool as recited in claim 1, wherein the end portion of said filmstrip includes at least one perforation having a length dimension and in which said film-catching member includes a necked portion having a length dimension which is larger than said perforation length dimension.

5. A takeup spool as recited in claim 4, wherein said film retaining portion of said film-catching member has a length dimension which is larger than said perforation length dimension for retaining said filmstrip to said spool.

6. A takeup spool as recited in claim 4, wherein said film-catching member including a film detaching portion oppositely disposed from said fill retaining portion, said film detaching portion having a length dimension which is larger than said perforation length dimension.

7. A takeup spool as recited in claim 6, wherein said film detaching portion includes a beveled surface to allow the filmstrip to be removed from said film-catching member.

8. A method of winding a filmstrip onto a takeup spool having a radially extending film-catching member and an adjacent cutout region, comprising the steps of:

i) attaching a perforation of a leading portion of the filmstrip onto a fill retaining portion of said film-catching member, said fill retaining portion having at least a portion extending over said cutout region; and ii) winding the attached filmstrip onto the takeup spool by rotating the spool in a film winding direction.

9. A method as recited in claim 8, including the step of iii) unwinding the filmstrip from the takeup spool by rotating the spool in a fill unwinding direction wherein the end of the leading portion of the filmstrip is rotated into a cutout portion of the spool to prevent reverse bending of the filmstrip.

10. In a camera comprising a film roll chamber for retaining a rotatable takeup spool and a film cassette chamber for containing a film cartridge having a filmstrip contained therein, wherein the filmstrip is wound and unwound onto and from the takeup spool from and into the film cartridge, said takeup spool having a film-catching member for releasably securing said filmstrip to said spool, characterized in that:

said takeup spool includes a cutout portion for receiving a trailing end of said filmstrip when the filmstrip is being unwound from said spool so as to avoid bending of the trailing end as the filmstrip is detached from said film-catching member, said film-catching member including a film retaining portion which extends into the cutout portion.

11. The invention according to claim 10, wherein the filmstrip includes a set of perforations each having a length dimension and said film-catching member has a dimension which is smaller than the length dimension of a said perforation, wherein the film retaining portion has a length dimension which is greater than the length dimension of a perforation for securing the filmstrip to the spool to allow film winding.

* * * * *